(12) United States Patent
Gary (10) Patent No.: US 10,176,661 B2
(45) Date of Patent: Jan. 8, 2019

(54) METHOD TO AUTHENTICATE VALUE DOCUMENTS OR ITEMS (71) Applicant: Robert Fenton Gary, Hagerstown, MD (US)

(72) Inventor: Robert Fenton Gary, Hagerstown, MD (US)

(*) Notice: Subject to any disclaimer, the term of this patent is extended or adjusted under 35 U.S.C. 154(b) by 0 days.

(21) Appl. No.: 14/999,947

(22) Filed: Jul. 18, 2016

(65) Prior Publication Data

US 2018/0018845 A1   Jan. 18, 2018

(51) Int. Cl.
| | |
|---|---|
| *G06Q 40/00* | (2012.01) |
| *G07D 7/20* | (2016.01) |
| *G06K 7/14* | (2006.01) |
| *G06K 19/06* | (2006.01) |

(52) U.S. Cl.
CPC ............ *G07D 7/20* (2013.01); *G06K 7/1417* (2013.01); *G06K 19/0614* (2013.01); *G06K 19/06037* (2013.01)

(58) Field of Classification Search
CPC ................... G06Q 10/0833; G06Q 20/203
USPC ........................................ 235/379, 380, 385
See application file for complete search history.

(56) References Cited

U.S. PATENT DOCUMENTS

| | | | | | |
|---|---|---|---|---|---|
| 5,986,550 | A * | 11/1999 | Rapaport | ............... | G01R 33/44 235/380 |
| 7,441,704 | B2 * | 10/2008 | Ross | ................ | G06K 19/06009 235/454 |
| 7,845,570 | B2 * | 12/2010 | Schwenk | ............. | G07D 7/0026 235/487 |
| 7,926,730 | B2 * | 4/2011 | Auslander | ........ | G06K 19/06046 235/487 |
| 8,328,102 | B2 * | 12/2012 | Rapoport | ............... | G07D 7/122 235/468 |

* cited by examiner

*Primary Examiner* — Daniel St Cyr (57) ABSTRACT

This invention uses variables sets, that are called up according to a file a into a Programmable Finite Impulse Transform (FIT) algorithm, which then sends a command to a Programmable Finite Impulse Response (FIR) filter (a brick wall filter) that makes multiple passbands. The digital passbands edit a spectral range from 200 nm to 1500 nm into multiple snippets thus generating an edited-down variation on the spectral range coming from fluorescent taggants. The full-wide peaks profile from a zone containing side-by-side fluorescent taggants is uniform on all the value documents or items in a series, but the Programmable FIT algorithm and the Programmable FIR multiple bandpass filter turn that single peaks profile signature into millions of distinct and specific variations, so each value document or item has its own unique key in a database. The full-wide emissions profile, as edited by a digital multiple bandpass filter into snippets, constitutes the product of the digital signal processing aspect of the present invention. This product can be compared on a one-to-one basis with a similarly made product on file in a database. A match of 95% to 100% causes a rating of authentic.

3 Claims, 6 Drawing Sheets

METHOD TO AUTHENTICATE VALUE DOCUMENTS OR ITEMS

CROSS-REFERENCE TO RELATED APPLICATIONS

This application, as currently amended, claims priority from U.S. Provisional Patent Application 62/282,879 filed on Aug. 13, 2015, which is incorporated herein by reference.

STATEMENT OF GOVERNMENT SPONSORED SUPPORT

None, not applicable

CROSS-REFERENCES TO RELATED APPLICATIONS

None, not applicable

STATEMENT REGARDING FEDERALLY SPONSORED RESEARCH OR DEVELOPMENT

None, not applicable

THE NAMES OF THE PARTIES TO A JOINT RESEARCH AGREEMENT

None, not applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

None, not applicable

STATEMENT REGARDING PRIOR DISCLOSURES BY THE INVENTOR OR A JOINT INVENTOR

None, not applicable

BACKGROUND OF THE INVENTION

The use of fluorescent taggants for value documents, value items, labels, ID cards, or other security purposes, is a well-developed field of invention, containing the work of many highly capable persons such as: William R. Rapoport, Judith D. Auslander, Gerhard Schwenk, Gary A. Ross, and Erich I. Rapaport.

Their patents most germaine to the background of the present invention will be outlined and discussed briefly.

U.S. Pat. No. 8,328,102 B2 by William R. Rapoport (the "Rapoport Patent") uses taggants incorporated into or onto value documents, and contains methods of authenticating such documents by detecting and assessing emissions of radiation at pre-determined levels. The comparison process is done by a central processing unit (CPU), working with a programmable application specific integrated circuit (hereafter P-ASIC), so the emissions received from the value document are compared with pre-selected validation criteria to authenticate, or reject the value document.

The Rapoport Patent describes a first rare earth active ion in an inorganic crystal lattice, that absorbs incident infrared radiation with wavelengths from about 1300 nm (nanometers) to about 2200 nm. This energy is then transferred to a second rare earth active ion, which proceeds to emit a second wavelength that is longer than the first wavelength, i.e. from about 1400 nm to about 2200 nm. The authentication apparatus ascertains that the emission from the second active ion is within the pre-selected validation criteria.

So, what we have here is a chain, or sequence of linked occurrences, which could be called a cascade of excitation and emissions. The final result of this cascade depends entirely on the rare earth ions chosen, and the inorganic crystal lattices chosen. These variables produce emissions that are varied, depending on the choices made, and complicated enough to prevent counterfeiting.

The Rapoport patent seeks to vary and complicate the emissions so that unique validation criteria are created. A computer can store these, and use them to validate value documents at a later time. This system uses light emitting diodes (LED) as illumination sources and is intended to work at high speed on banknotes and other items.

What complicates the emissions in the Rapoport Patent is the cascade process, that entails using two rare earth ions in a sequence of excitations and emissions. There's a sequence of occurrences that takes place, and this results in an emissions signature that validates, or not, the banknote, or other item.

The amount (i.e. molar percent concentration) of the rare earth active ions can be varied as well, and this provides another dimension in which the material composition of the taggants zone can be varied.

If the variables: active ions, their concentrations, their substrate nanoparticles, and pairs of rare earths to make the sequences, must be changed for each banknote or other secured item, the Rapoport patent would be exceedingly difficult to make as a matter of manufacturing and precise emplacement of materials. It would be costly, and complex, or it would be not very reliable.

Even if the formulas are changed only once entire sets or series of secured items, it would still be costly and difficult to make value documents, or other secured items, in sets each of which had its own special combination of the materials that create variations in the final emissions profile that authenticates the members of the group. The patent would work, but it is overly complicated to make, and thus, commercially impractical.

On bank bills, particularly bank bills that, themselves, contained material of value, the Rapoport patent would be very attractive to would-be forgers since large sets of bank bills are authenticated by the same taggants zone mix, and emissions profile. The more intrinsically valuable the secured items, the more a forger can afford to spend breaking the security system and making counterfeits. If the bank bills contained gold metal, for example, the use of the Rapoport patent to protect them would be a magnet to forgers, and the larger the set of bills secured by the same taggants mix, the stronger the magnet. Making individual bills, each bill with its own special mix would be prohibitively costly, unreliable, and complex in high speed authentication.

The Rapoport patent is ideal for low value commodity products such as bottles of aspirin, which are made in large batches, and each batch could have its own taggants mix on the plastic seal over the bottle caps, or on the back of the containers. The cost of making new taggants zone mixtures would be amortized over many low-value units in the batch. No intrinsically valuable materials are involved, no gold, and no lives are at stake. The cost of changing the taggant zone mix must be low in the relation to the market value of the batch of commodity product. This means that the would-be forger has to spend a lot of money to break the security on a set of items that has a relatively low value. The Rapoport patent is ideal for deterring this sort of counterfeiting because it takes the profit out of the criminal act.

It would not work as well on gold bearing bank notes, or postal money orders, where the amounts of money intrinsic to the secured items, or in transit by means of the secured items, is very high, and would justify large a budget to be used for the purpose of beating the security system by making fake items that pass as authentic.

U.S. Pat. No. 7,926,730 B2 Combined Multi-Spectral Document Markings by Judith D. Auslander, et al., uses first and second sets of taggants, having different luminescence wavelength bands, such that, at an overlap location, they are not intrusive with each other. Together, they create a multi-spectral key, as drawn in FIG. 10 of the Auslander Patent. One of the spectral markings is prioritized, for authentication purposes, using information contained in the first marking. In a sense, one could say there's a key to the key. The priority data in the first marking triggers a pre-determined prioritization table, stored in working memory, which is then applied to the second marking. In short, the final key is by a sequence of occurrences that depend on the contents of the first and second taggants, which are in distinct taggant bearing areas on or in the value document, or value item.

As a practical matter, emplacing two taggants bearing zones that must be varied from item-to-item is costly, complex, and requires a level of authentication machine calibration that would be hard to maintain if the machine were operating at high speeds. To authenticate a document the two taggant zones must be used in sequence, since the first designates the pre-determined table used to validate the second. Just the physical process of mixing and emplacing the taggants zones for millions of different pieces of mail, would be very high compared to the marginal value to be gained by securely authenticating those mail items, or almost any items, except things of high value like bank bills containing gold, or money transfer orders, or things with sensitive security implications like ID cards, or evidence slabs or tags. The advantage of the system, using two taggant zones and many distinct prioritization tables, over regular bar codes, is not adequate to commercially support the complexity, emplacement of taggants costs, and operational fragility of the system. The system itself is ingenious, and if applied to large sets of interchangeable value items like containers of clothing, or bottles of medication, it would be viable and value-adding. However, linking the serially utilized spectral emissions to tables of priority comparison brought into working memory, would always be costly, complicated, and operationally fragile, to do at high speed. Such an authentication machine would be subject to frequent mis-cues, downtime, and outages.

U.S. Pat. No. 7,845,570B2 Value Document, a Patent by Gerhard Schwenk, et al., has at least three different feature substances, as ways of creating variations, to check a value document by one-to-one comparison. The second substance is luminescent, and the third substance is absorbent over a specific spectral range. By combining these, a spectral signature is produced, and then partially blocked. The third substance does not produce its own active luminescence, so it's hard for a would-be forger to analyze the third substance and know what it is. The third substance simply absorbs infra-red radiation, but it does not absorb radiation in the visible range. In the visible range no patterns or shapes can be seen. But in the IR range, patterns and shapes can be found, because of the use of the blocking material.

The substrate, which can be paper, made from cotton fibers, has the luminescent layer, and then the blocking layer is added by printing, gravure, screen, letterpress, inkjet, offset, or other similar method.

The emissions, from the resulting combination of layers, when examined in the IR range, form patterns or shapes, which can be varied, and thus create another axis of variation, on which the key, used to authenticate the document, can be applied. The authentication machine looks in the IR range for a signal in a specific shape or pattern, and uses two-dimensional pattern recognition to validate, or not, the document. One major advantage of the Schwenk Patent, is that soiling of the value document is not a problem in the IR range, which is what the authentication machine looks at. With soiling being much less of a problem, there is less need to remove noise from the signal (clean it up digitally in an optical spectrum analyzer). This feature of soiling overcoming, would be of significant value on bank notes, ID cards, or money orders, which can receive much soiling, due to much human handling.

In short, the Schwenk Patent combines luminescent taggants, and shaped IR blocking, to make patterns in two-dimensional space (on the plane of the document), and then, pattern recognition can be used to authenticate the document, in the IR range, where soiling is not a major problem.

If different patterns must be created, imprinted, and recorded for many secured items, this system is prohibitively expensive. If many items, in large sets, are imprinted and authenticated using the same patterns, the Schwenk Patent would work very well. This might be on labels for mass manufactured items like boxes of fasteners, or bottles of vitamins. This method would not be very secure, if the same pattern were used to identify many high-value items, like bank notes containing gold, or life-critical items such as ID cards or evidence slabs, where individual secure authentication is essential.

Since this method requires both spectral analysis and pattern recognition to validate an item, it is complex and difficult to run at high speed if all the items are differently coded. If they are valuable, or life-critical, and are all coded the same, the method of the Schwenk patent is inadequate as a security measure because the gain, to be obtained by breaking the code, is high enough to attract well-funded forgers of major talent, resources, and skill. The forgers would replicate the emissions and duplicate the patterns, in short order, if there were a huge financial or national security gain to be obtained by doing so. Any taggant system to be used on very sensitive items, or very valuable items, must withstand the dedicated efforts of the best and most skilled counterfeiters in the world, or it is a hazard, and not an enhancement.

U.S. Pat. No. 7,441,704 B2, System and Method for Identifying a Spatial Code, by Gary A. Ross, et al., describes a plurality of security tags having one or more characteristic emission spectral profiles that are detected by an image detector. The variations created, in this patent, depend on the shapes and position of the images, the spectral profiles, and decay times, because the security tags are stimulated by time-spaced illuminations. The spectrometer "sees" the emissions on a time-spaced basis.

For a secured item to be rated authentic, the spectral profiles, the spatial images, and the time-spaced emissions, must all be right The "spatial image" of a spatial code includes one or many dimensional images of the code, at one or many emission wavelengths.

The received images, and time-spaced emissions are compared with pre-defined images and time-spaced emissions that are stored in a database. The emissions intensity, which decays over time, should last at least 100 nanoseconds to 10 microseconds.

The system described in the Ross Patent would be prohibitively costly if all the variables had to be changed to be applied on an item-by-item basis. The patent would be applicable to mark and authenticate objects in sets like aviation bolts, or parts of machines, or bottles of medication, which are mass manufactured, and yet their authenticity is important to persons in the supply chain, and to final users as well. This patent could apply to clothing containers, or retail goods.

The Ross Patent mentions LEDs to illuminate the tags and a CCD detector, and a spectrophotometer, to record the spatial codes and emissions spectra. The spatial code is identified, in combination with the spectral information, and that is how many variations are made. Marking sets of objects, in such a complex way, would be commercially feasible in large sets, but not for individual objects. The Ross Patent specifies that, for some applications, the exciting radiation and the emitted radiation are preferred to be in the visible range.

This patent would entail very complex calibration of the authenticating machine so that the CCD records, the spatial codes, the emissions profiles, and the decay time features, are all made part of the authentication process. A product, like bank bills, which runs into the millions of individual items, each of which needs its own authentication key, and which must be processed at high speeds, would not be commercially affordable, even if feasible, using the method described by the Ross Patent. When large amounts of money or human lives are at stake, and their loss cannot be insured against, such as CIA case officers, or Nuclear Regulatory Commission reactor inspectors, reliability, in the authentication of an ID Card, is crucial. The same applies to money orders, or evidence slabs, or tags. Reliable recognition of highly complex tags, using high speed equipment, would be uneconomic as a business proposition, even if the machines could be calibrated, because they would not perform smoothly for any significant amount of time. They would stop, and need to be adjusted often for satisfactory operational readiness, even if they could be made adequately reliable.

U.S. Pat. No. 5,986,550A by Erich I. Rapaport deals with nuclear resonance and electron spins which are authentication methods completely different from fluorescence and not in any way applicable to the present invention.

There have been numerous methods and apparatuses that use taggants to authenticate objects: (U.S. Pat. No. 20050178841 AlGuilford Jones, et al., System and Methods for Product and Document Authentication; U.S. Pat. 20100149531 A1 Shu Tuen Tang, Apparatus and Method for Object Authentication Using Taggant Material; U.S. Pat. 20060186348 A1 Brian Nguyen, et al., Method for Encoding Materials with a Luminescent Tag and Apparatus for Reading Same; U.S. Pat. 20080048106 A1 Elwood Neal Blanchard, et al., Method and Apparatus for Verifying the Authenticity of an Item by Detecting Encoded Luminescent Security Markers.)

Taggants have been used to verify objects by doping them on to nanoparticles in various ways: (U.S. Pat. No. WO 2011082031 A1 Brant U. Kolb, et al., Zirconia-based Particles Doped with a Lanthanide Element; U.S. Pat. 20030111644 A1 In-Gann Chen, et al., Process for Producing Nanoscale Yttrium Aluminum Garnet (YAG) Fluorescent Powders; U.S. Pat. No. 6,699,406 B2 Richard E. Riman and John Ballato, et al., Rare Earth Doped Host Materials; U.S. Pat. No. 20060033325 A1 Sriramakrishna Maruvada, et al., Authenticatable Article and Method of Authenticating; U.S. Pat. No. 20090224218 A1 George M. Williams, et al., Photoactive Taggant Materials Comprising Semiconductor Nanoparticles and Lanthanide Ions.)

Taggants have been used on or in plastic film, in strips, in layers, or in coats, and sometimes annealed to get better fluorescent intensity: (U.S. Pat. No. 20130040150 A1 Morgana M. Trexler, et al., Nanoparticle Taggants for Explosive Precursors; U.S. Pat. No. 6,699,406 B2 Richard E. Riman, et al., Rare Earth Doped Host Materials.)

Fluorescent taggants have been used to prevent forgery: (U.S. Pat. No. 6,663,960 B1 Toru Murakami, et al., Fluorescent Particles, Method for Preparing the Same and Paper Preventing Forgery Using the Fluorescent Particles.)

Mixtures of taggants have been used to produce random patterns of spectrally varying fluorescence to make a unique signature for each label, and where the fluorescence signature for each label is entered into a database at the point of manufacture or point of application: (U.S. Pat. No. 6,692,031 B2 Stephen P. McGrew, Quantum Dot Security Device and Method.)

Tamper-evident security coatings, labels, films, or plastic layers can be affixed to a product so that fragmentation occurs to disclose any tampering: (U.S. Pat. No. 5,411,295 A Scott B. Bates, et al., Tamper-evident Label; U.S. Pat. No. 6,447,015 B1, Ron Linnewiel, Tamper-Evident Tapes and Labels; U.S. Pat. No. 6,096,387 A Thomas A. Decker, Methods for Providing Self-Adhesive Resealable Tamper-Evident Tape.)

Infra-red radiation has been used with taggants doped with two rare earth ions to authenticate value documents: (U.S. Pat. No. 20110147450 A1 William Ross Rapoport, et al., Method and Authentication for Authenticating Value Documents.)

The present invention overcomes the limitations of the prior art, by using Digital Signal Processing (DSP) inside the authentication machine, instead of complex patterns, shapes, emission decay times, blocking, or cascades of emission and re-emission on the value item. The present invention is a method of authenticating a value item that relies partially on fluorescent taggants. But mainly, it relies on digital signal processing (DSP), that takes place on Programmable Application Specific Integrated Circuit chips, herein called P-ASIC chips, and in a computer.

Every aspect of the authentication process, leading up to the full-wide spectral peaks profile coming to the optical digital spectrum analyzer can be called the "front-end" of the authentication system. This includes light emitting diode (LED) illumination of the taggants, capture by the sensors, of the resulting fluorescent emissions from the taggants, and devices to digitize and preliminarily clean up the signal, by elimination of electronic "noise".

The Digital Signal Processing (DSP) claims of the present invention are focused on the programmable finite impulse response (FIR) filter. FIR filters have been on the market for a long time. This invention pertains to their application in making multiple passbands (snippets) for purposes of authenticating a value document or item.

The invention uses DSP to allow a single standardized uniform set of taggants to authenticate a whole series containing millions of value documents or items.

Many patents have been written that seek to create variations of a spectral peaks signature. They do it in ways that can be broken down into classes. These are presented in the Background section of this specification. The present invention relies on one variation of the taggants for an entire series of value documents or items, and thus it is cheaper, better, faster, and more secure, than any of the ways described in the prior art. The field, of using taggants to identify items, is long-standing, and crowded with innovations, so the background patents are ingenious, but too costly and complex, to be entirely practical for commercial purposes.

The present invention departs from the others, because it uses just one taggants group, per series of value documents or items, to authenticate possibly millions of items. This is done by using a Finite Impulse Transform (hereafter FIT) algorithm in conjunction with a Programmable Finite Impulse Response filter (hereafter FIR or "brick wall"). The FIR filter makes snippets, which can be highly various, but are all based on the same full-wide emissions coming from the standardized and uniform Taggants Zone used on that series of value documents or items.

Nothing, on the secured value documents or items, is sufficient to generate a false rating of "authentic", no matter how skillfully the secured items are reverse-engineered and physically replicated. A perfectly copied taggants zone won't be enough. Even if the taggants zone is perfectly copied, and even if the file number, which is highly encrypted, is somehow decrypted, or just copied without decrypting it, the forger can only counterfeit one of the secured items. Crimes that are very difficult, risky, and costly to do, and yield almost nothing, by comparison to the cost of doing them, are not done. In the case on an ID Card, or evidence slab, or tag, there are secondary human back-ups in the form of trained, observant, security professionals, which the forger would not be able to overcome. ID Cards can include: color photographs, biometric data, holograms, and other elements or methods.

The present invention has the unique feature that any secured item can be invalidated at any time by re-programming the programmable FIT algorithm and FIR filter files on the P-ASIC chips in the computer. Software can be updated, and all the data on the P-ASIC chips is software. Every file in every library of variables, or of final verification keys, can be erased and replaced. The chips themselves can be removed and replaced with chips that contain entirely different variables files for making snippets, and as comparison keys in a database, for final one-to-one comparison for getting a rating of "authentic".

The present method is robust. It can take a hit. If it's being beaten by a forger, or if one of the authentication machines is captured by criminals and the P-ASIC chips read out, this system can be updated and restored to full security readiness with changes in software, changes in P-ASIC chips, or, in a worst case, by incapacitating and replacing all the P-ASIC chips in the system.

The ability to respond quickly and decisively to a major security breach is something no other patent in this field has.

Soiling can put noise into the system, and make it hard to clean up the signal in the optical digital spectrum analyzer. But, the system, of the present invention, can achieve the same result by simply giving the sensors and the optical spectrum analyzer more time on each item.

More time under examination means better resolution. Thus, this system is robustly able to respond of soiling challenges. None of the background patents have any commercially significant advantages over system of the present invention in the soiling mitigation area of performance.

The Taggants Zones, on all the value items of a given set, from a given organization, are all identical. The taggants are placed on or in the substrate, which may be paper, or plastic, in a way, which may include, but not be limited to: in straight stripes, in wavy stripes, in circles with the widths the same, (like an archery target), in circles with the widths not the same, in polygons such as rectangles, parallelograms, and hexagons, or in layers.

The taggants chosen must, when illuminated by an array of LEDs, emit fluorescence over a full-wide range. This means a lot of emissions, at high intensities, in the range from 200 nanometers to 1500 nanometers. This requires selecting rare earth ions, nanoparticles, and concentrations (molar percentages), that, when used as a group, will create many intensive emissions peaks over the fullest and widest range practicable within the specification 200 to 1500 nanometers.

Since the taggants zones are all standardized and uniform over the full range of value documents or items in a series, it is cheap to put them on the set of items by: printing, gravure, inkjet, screen, etc. There are no special shapes, or special blocking patterns hidden in the taggants zones of individual items. There are no special decay times, or electron spins, or nuclear resonance factors, that vary from item-to-item within the set. Millions of secured items can be given the standardized uniform taggants zone which can be emplaced on them using a low-cost way. This is one aspect of the present invention, that represents a major departure from what was known before. The method of the present invention is commercially viable because it is cost-effective to emplace the taggants on or in the value items, because in a given set, all the taggants zones are standardized, uniform, and simple to print. This greatly enhances reliability, as well keeping costs down.

The taggants zone, in its specific combination of rare earth ions, nanoparticles, and concentrations, by itself, is only marginally relevant to the authentication process. It is physically necessary, by functionally insufficient, to ever generate an authentication. This invention is centered on the variables sets, on the Programmable Application Specific Integrated Circuit, or P-ASIC, chips in the computer from which the FIR filter makes the snippets. The snippets are the true criteria to authenticate individual secured items.

FIELD OF THE INVENTION

Coded Record Sensors/Fluorescent 235/491; and
Coded Record Sensors/Particular Code Pattern 235/494; and
Coded Record Sensors/Optical 235/454

DESCRIPTION OF THE RELATED ART
INCLUDING INFORMATION DISCLOSED
UNDER 37 CFR 1.97 AND 37 CFR 1.98

None, not applicable

BRIEF SUMMARY OF THE INVENTION

The method of the present invention uses fluorescent taggants to authenticate value documents or items, but does not depend solely upon them. Instead, it relies largely on a series of digital signal processing steps, combined with a library of variables sets that a Programmable Master Fast Fourier algorithm can call up. These can then be substituted into a programmable Fast Fourier transform algorithm called a Finite Impulse Response filter (FIR) that converts the specifications, which are the variables sets, into a digital multiple passband filter. This filter edits the emissions coming from the fluorescent taggants, in a unique and specific way, depending on the file number of the item being examined. The segments of the emitted peaks profiles that are used to verify a given item are called "snippets" and the number, width, and position of the snippets is different for every secured item. The variables sets used depend on the file number, and that is found encrypted on the QR zone on the item. The taggants bearing zone and the QR zone containing the file number, in encrypted and hard to copy form, appear side-by-side on the front surface of the value document or item.

BRIEF DESCRIPTION OF THE SEVERAL VIEWS OF THE DRAWINGS

The area indicated by the heavier black vertical lines is where any printed information or graphical presentations would be on an ordinary value document or item. In the case of a value document that contains value material enmeshed and affixed between, among, and on the fibers of the paper, this area, which covers the entire value document, except for ¼ inch around the periphery, is where the value material, if any, would be present in the paper, and also where the information or pictures are present on the surface of the paper.

FIG. 2 also shows the side-by-side configuration of the taggants bearing zone with the QR zone. The taggants bearing zone is where the full-wide fluorescent emissions are generated, which are used in the method of the present invention. The QR zone contains the encrypted, and hard to copy, file number that, allows the FIT algorithm and the FIR filter to make the snippets that are required to authenticate the value document or item. These snippets are compared to similarly made snippets, on file, in a database in a library, under the same file number, on a programmable application specific integrated circuit P-ASIC chip.

FIG. 5 shows the illuminator disc and emissions collector tube inside the authentication machine. The angle CBH is 60 degrees, as the angle DAI, and all the angles in the two equilateral triangles between the points LABM are also 60 degrees. The taggants zone AB is 1.25 inches wide, which means the tube's distance from the label is 2.5 inches, and the illuminator disc plate KJ has a distance from the track on which the bill rests HI of 5 inches. The LED's at C and D are 2 inches from the center of the illuminator disc and set at exactly 60 degree down angles so the coverage of the label is 100% from either side.

Since there are 9 LEDs rather that 8, C and D are not exactly opposite each other, as the drawing may seem to suggest. But, the important angle of 60 degrees down is maintained by all 9 LED's going around in a circle on the plate separated from each other by 40 degrees of arc. The circumference of the circle on which the LEDs are placed is 12.5664 inches, so one LED is placed every 1.39622 inches around in the circle. They all point down at 60 degree angles. So they all fully illuminate the central region of the taggant-bearing zone which is what the emission collector tube is aimed at. Bracket E holds three sensor heads, one for ultra-violet, one for visible light, and one for near infra-red. The sensor heads, which may contain charge coupled devices, are wired to F the transducer which may contain an amplifier.

FIG. 6 shows the entire authentication process. It starts at the top left where the conveyor tracks bring the value document or item under the taggant-bearing zone reader and the QR zone reader. The analog signal goes to the transducer, and then to the optical digital spectrum analyzer. The signal then passes from analog technology over to digital technology when it enters the digital signal processing assembly, made up on a computer, several micro-controllers, and several programmable application specific integrated circuits. The signal then goes to a small circle which represents the mechanical process of handling the bills along the track and tipping off the authenticated ones into the authenticated bills slot and any other bills into the rejects slot.

DETAILED DESCRIPTION OF THE INVENTION (GENERALLY)

Definitions Relevant to the Present Invention

"Printed" or "Imprinted", for purposes of placing the taggants on to the taggants zone on the paper includes, but is not limited to: printing, gravure, screen, letterpress, inkjet, laserjet, offset, or other similar method of placing the taggants on or in the substrate, which may be paper, plastic, or a combination of paper and plastic.

"Labels", or "Affixed Labels", for purposes of the QR zone of the present invention, includes but is not limited to: plastic labels that are affixed to the substrate of a value document or item. Such affixed plastic labels embody holographic techniques that are best done on plastic labels affixed to the substrate rather than by executing those holographic techniques directly on the substrate of the value documents or items. The labels conceal the file numbers, but outside the context of being used in an authentication machine of the present invention, the mere file numbers are utterly meaningless. So, the hard-to-copy holographic labels for the QR Zone can be made by any reliable firm able to fabricate them.

"Side-by-side", as a description of how the singly-doped taggants are arranged in the taggants zone, includes but is not limited to: in stripes, in circles, in rectangles, parallelograms, hexagons, or in other polygons. The taggants zone can be imprinted using shapes defined by curved lines, and here are two examples: Concentric circles, which may be of equal width, like on an archery target, or which may be concentric but of unequal width. Or, they may be a rainbow arrangement, like one quarter or one half of an archery target. The factors that matter are that there be no blank spaces, as there would be if polka dots or separated areas were used, and that there be no overlap, which would cause obstruction of confounding of the signal. Blank spaces would be a problem, because non-fluorescent light from the LED's could be reflected back from the blank spaces and go to the sensors. This would harm the fluorescent signal by contaminating it with light from the LED's none of which is supposed to be included in the full-wide emissions profile. The LED's include most of the wavelengths between 200 nm and 1500 nm. For this invention to work well, the sensors must only "see" fluorescent light from the taggants in the taggant zone. The signal must be consistent from one value item to the next. So anything, such as stray reflected LED photons, will cause contamination of the signal.

In the taggants zone, whether imprinted with straight or curved areas, it is not necessary that equal areas be devoted to each kind of rare earth ions. Some ions will be more intensively fluorescent than others per unit of area, and this can be adjusted for by using smaller areas for the most active rare earth ions, or bi-dopant, or tri-dopants, and larger areas for rare earth ions, or bi-dopant, or tri-dopants that are less intensively fluorescent. The LED's can also be powered at different levels, again for this same counter-balancing reason. What's desired is a very full, very wide, peaks profile signature with many clearly defined peaks along its entire length.

"In layers", as a description of how singly doped taggants could be arranged in the taggants zone, is an alternative to side-by side, and is not the preferred embodiment. As long as the nanoparticles are optically transparent, it is a possible embodiment of the invention. If the taggants are emplaced on the substrate in optically transparent layers, there could still be Absorptions and re-emissions comprising secondary excitations. Such confounding may be considered useful for some applications of the invention, but it is not the preferred embodiment. Simplicity, uniformity, standardization and thrift are primary features that are optimized in the preferred embodiment of the present invention. Putting the taggants on in layers would be complex, costly, and possibly unpredictable in regard to uniformity and standardization. The taggants zone on each and every value item must be standardized and uniform for a given series of value items. So, layered taggants is not preferred for the present invention.

"Full-wide spectrum" for purposes of this invention is defined as the peaks profile signature coming off the excited taggants zone, for a given series of value items, before those emissions are edited down into snippets. The fullest and widest spectrum between 200 nm and 1500 nm is very much a part of this invention and a detailed description, including examples, will be provided below.

Digital Signal Processing, or DSP, for purposes of this invention includes a Master Programmable Fast Fourier Algorithm which calls up a variables set and makes it ready to send on to a Programmable Fast Fourier Finite Impulse Response Algorithm, which converts the specifications (variables in the variables set) into a multiple bandpass filter executed synthetically in the digital domain by assigning 1's to all the passband segments(snippets) and 0's to all the blocked band segments. The blocked band segments are stopped as if by a brick wall. The passband segments constitute the edited down peaks spectral signature which was used in the lab to make the comparison ideal in the database, and which is also used in the field to make the key that is supposed to match the ideal in the database. Much of the DSP used in this invention depends on information stored on Programmable Application Specific Integrated Circuits (P-ASIC). P-ASIC's are also where the Master Programmable Fast Fourier Algorithm, and the Programmable Fast Fourier Finite Impulse Response filter run. So, P-ASIC's are used to store information and to run programs, and they are vital parts of the Digital Signal Processing end of the present invention, which is sometimes referred to as the back-end of the authentication machine. The DSP suite includes some parts of the optical digital spectrum analyzer, the various specialized P-ASIC chips, microcontrollers, computers, and key storage databases, and variables storage libraries. Generally, DSP operates in four domains: time, space, frequency, and wavelet. For this invention, the frequency domain is most important. Signals are converted from the time and space domains into the frequency domain through the Fourier Transform, and this invention uses a variation called the Fast Fourier Transform which converts the signal information to a magnitude and phase component of each frequency. The DSP suite analyses the signals in the frequency domain find the intensity of the signal as frequency varies over the spectral range and this comprises the spectral peaks signature between 200 nm and 1500 nm. The full-wide spectral peaks signature is then edited down to the snippets that are the key for authentication of each unique item in the series of value items, which may run to millions of uniquely identifiable and specifically authenticatable value items.

The "bandwidth of a snippet" is the difference between its limiting frequencies. Many snippets of various bandwidths and locations on the spectrum from 200 nm to 1500 nm constitute an edited peaks profile, which is a key that matches an ideal key on file in a database on a P-ASIC chip in the DSP suite which is the back-end of the authentication machine of this invention.

The front end of the system which includes the sensors, the transducer, the fluorospectroscope and parts of the optical digital spectrum analyzer may contain band reject filters to eliminate noise, such as 60 Hz power lines, and soiling, creasing, or marking on the value items. The front-end of the system cleans up the signal before sending it on to the DSP suite. For this purpose, narrow notch filters may be used, and they are sometimes called band-reject filters.

Finite Impulse Response (FIR) Filters can be analog or digital, but in this invention they are digital. They are sometimes called "brick wall" filters. They are "finite" because they respond to a finite length input, and settles to zero in finite time—in the case of this invention "fast" because that's how Fast Fourier algorithms in the frequency domain operate. This is important because the invention here must authenticate many value items in a way that is commercially useful. In the commercial realm time is money so speed is important, as are reliability, and thrift. There are tradeoffs between these factors as will be specified in another definition below.

High Quality Sampling, means many samples are taken, which allows high resolution. Usually the more samples are taken in a given finite time, the shorter the sampling time must be for each sample. But the authentication machine in this invention can be slowed down by using the same high number of samples, and giving the original (longer) time for each sample, not a shorter sampling time. This means that when the machine is operating in slow mode it takes more time to examine each value item.

Snippets are segments of the full-wide peaks profile that have been designated by the multiple bandpass filter created by the FIR filter, based on the specifications that are a set of variables called up from a library on a P-ASIC chip and sent to the FIR filter by the Programmable Master Fast Fourier Algorithm. Snippets are passbands and include all the fluorescent intensities ea within those passbands. Many snippets, as a set, comprise a key, i.e. an edited-down version of the full-wide peaks profile of the emissions. The snippets are in the same serial order from 200 nm to 1500 nm as the emissions in the full wide peaks profile. They are not jumbled around. The system can be kept simple because the full-wide peaks profile allows a very large number of possible snippets combinations to be made. The specifications for snippets are made by a large computer where most of the heavy computations are done. The FIR filter in the authentication machine in this invention just loads them, according to their file number, and makes the actual digital multiple passbands by editing down the full wide peaks profile i.e. the emissions coming from the taggants zone as cleaned up by the front end of the system.

An Optical Digital Fast Fourier Spectrum Analyzer is a device that measures all incoming frequencies at the same time. The total signal amplitude in each frequency bin can be displayed independent of phase. This digital machine captures, analyzes, and displays noise as a function of frequency and allows a signal received from an array of sensors to be digitized at a high sampling rate and transformed into the frequency domain. In this invention this machine is at the borderline between the analog front end of the system, and the purely digital back end (i.e. DSP-end) of the system.

Detailed Description of the QR Square of the Invention

The QR square must both conceal the file number, and be very hard to copy. Making it hard to copy will require holographic techniques which may include but are not be limited to: flip-flop hologram, deep 3-D image hologram, hologram QR code, hologram with data matrix, nano-text hologram, and 3-D custom hologram. A QR square composed of simple black and white squares would encrypt the file number, and yet, be easy to copy. This means that a value document or item, using a simple black and white QR Square, could be counterfeited, if the taggants zone could be counterfeited, even without discovering the file number. Use of holographic techniques, as specified, makes this costly to do. No security method is 100% invulnerable to skilled, equipped, and well-funded, counterfeiters. The best security method makes counterfeiting technically hard, expensive, risky, and unprofitable.

Detailed Description of the LED Lights Aspect of the Invention

By using nine LED lights, where each light covers a different segment of the spectrum, with some slight overlap, the illumination process becomes "tunable". The 9 individual LEDs can operate at different levels of light intensity, and by adjusting these levels in the lab, it is possible to discover the ideal combination of light levels for the nine segments together to yield the fullest, widest, most distinct, sharpest peaks profile signature for a given set of taggants. An entire series of value items all use one set of taggants printed on the value items so the various taggants are side-by-side, except in the cases of bi-dopant, or tri-dopant ions, which are intrinsically mixed with each other.

Another possible aspect of the invention would use one LED, or 3 LED's, where one LED would cover the entire spectral range from 200 nm to 1500 nm, or where 3 LED's would each cover a third of the range each and thus together cover the entire range.

Another aspect of the invention would be to have a circle of nine small LED's each of which covers the entire range from 200 nm to 1500 nm. Because such LEDs would be separated from each other, in a circle arrangement, and operating individually at low power levels.

However, the feature of tunablity is considered so valuable, that the preferred embodiment is the nine specialized LED's in a circle, so that the intensity, from each of the special segments of illuminating light, can be regulated to make the strongest and most distinctive peaks profile signature across the widest range of wavelengths.

A variables set defines a set of spectrum segments in the range from 200 nm to 1500 nm. Within these segments the authentication computer sees all the emissions. Outside of these segments, the authentication computer sees nothing whatsoever. All the points between 200 nm and 1500 nm that are inside the segments are assigned a "1" value, which means they are included in the edited peaks profile signature. All the points on the spectrum, between 200 nm and 1500 nm, that are not in a segment specified by the variables set, are assigned a "0" value, which means they are completely blocked, as if by a brick wall, and thus not included in the edited peaks profile signature. So the authentication computer really is just looking at a partial and edited down version of the full-wide spectrum of emissions that could come from the taggants.

For example one set of snippets defined by a variables set might be: 200 nm to 220 nm; 315 nm to 318 nm; 378 nm to 451 nm; 712 nm to 713 nm; 743 nm to 892 nm; 912 nm to 1102 nm; 1143 nm to 1422 nm; 1429 nm to 1431 nm; and 1449 nm to 1457 nm. These passbands would be "seen", along with all the emissions within their limits. Nothing else would be "seen" by the digital signal processing part of the present invention.

Thus edited, the peaks profile signature would be sent on to the computer, and its Programmable ASIC chip containing the pre-made keys library, for one-to-one comparison, by a program, that decides if the "goodness of fit" is at some pre-determined value between 95% and 100%. The goodness of fit required to get a rating of "authentic" needs to be programmable, and thus adjustable, so that field conditions can be accommodated and commercial standards, of speed and readiness, can be optimized, according to the business judgment of the business managers. Low Risk and Commercial Readiness are always a trade-off. Being able to adjust the system, based on business judgment, is key to system robustness and operational readiness.

The programmable ASIC chips are located in the authentication computer. Variables sets do not need to be made by hand, or in the DSP equipment of the system here described. They can be composed in a more powerful computer using an algorithm. Thus composed, billions of variables sets can be installed, under specific file numbers, on the variables set library portion of the P-ASIC chips. The pre-defined comparison keys are installed in the Library of comparison keys under their file numbers on the appropriate P-ASIC chips in the authentication computer.

Moreover, the snippets and keys defining variables sets, could easily be erased and replaced. This provides an important fall-back in case the system is somehow compromised, perhaps by criminals capturing an intact authentication machine and all its P-ASIC chips. The entire remainder of the system can be disabled, taken down, re-programmed with new variables sets, and keys, in a matter of a hours.

Quick system recovery is most critical for ID cards, where human lives, possibly of CIA case officers are at stake. But, it is also commercially critical in the case of value documents, where users want value or credit for their presented documents right away. Quick system recovery is also important in the case of evidence tags, where the freedom or even life of a human being might be at stake. Even For slabs containing value items or evidence samples, time could be of the essence.

Detailed Description of the DIGITAL SIGNAL PROCESSING (DSP) Aspect of the Invention:

Digital Signal Processing (DSP) is the use of digital processing, such as computers and Programmable Application Specific Integrated Circuit chips to perform a variety of storage, comparison, and signal processing operations. Signals in the frequency domain, processed in this manner are a sequence of numbers that represent samples of a continuous spectrum ranging from 200 nm to 1500 nm in frequency.

The broad field of signal processing include both analog signal processing, i.e. work done by LEDs, sensors, spectrofluorometers, transducers, and some of the parts of optical digital spectrum analyzers, and digital signal processing such as work done by other parts of optical digital spectrum analyzers, Fast Fourier Transform algorithms, digital multiple bandpass filters, Programmable Application Specific Integrated Circuits, microcontrollers, computers, and comparison key storage databases, and snippets defining variables storage libraries.

DSP operates in four domains: time, spatial, frequency, and wavelet. For purposes of the present invention, the frequency domain is the most important.

Signals are converted from time and space domains into the frequency domain through the Fourier Transform, herein most often called the Fast Fourier Transform (FFT). The FFT converts the signal information to a magnitude and phase component of each frequency. Signals are analyzed in the frequency domain to find the properties of the signal, such as intensity, as frequency varies over the spectral range, in our case from 200 nm to 1500 nm. In optical digital signal processing such analysis helps us to see images from CAT scans, or Magnetic Resonance Imaging (MRI) for example, or, in our case, from spectral emissions coming from fluorescent taggants. Fast Fourier Transforms are also used for processing digital photographs with software such as Photoshop.

Specialized P-ASIC's are used when vast usage in planned, and much of it requiring the same data processing operations, but with different variable data as inputs. A Fast Fourier Transform, called a Finite Impulse Response (FIR) filter, runs on a Programmable P-ASIC chip that has been custom designed can generate synthetic brick wall filters by assigning 1's to the frequencies that are to be passed through the filter, and assigning 0's to all other frequencies, which are then blocked as if by a brick wall. Those frequencies, and the intensities on them, are simply not "seen" by the optical digital spectrum analyzer. The snippets (frequencies segments over which 1's have been assigned, and their concomitant intensities), are seen and can comprise an edited version of the full wide spectrum from 200 nm to 1500 nm.

Ordinary electronic hardware can create a band-pass filter by combining a low-pass filter with a high-pass filter. Such a device can also be made digitally by using software. Bandpass refers to a type of filter. Passband refers to the frequencies that get through a bandpass filter. A multiple bandpass filter lets multiple passbands, herein called "snippets", through. A digital filter using digital assignments of 0's and 1's could be called a digital signal processing bandpass filter, and over a full wide spectrum from 200 nm to 1500 nm it could have passbands numbering in the thousands. These passbands could be called snippets, and the aggregated total of all the passbands, made by a single digital bandpass filter, could be called an edited spectral signature taken from the full-wide spectral signature. Such an edited spectral signature could be used as a key if it could be duplicated by making the full-wide emissions again, and applying the digital bandpass filter again in the same way. If the key is stored in a database, then any future similarly made key could be compared on a one-to-one basis with the reference key stored in a file in the database.

In astronomy, bandpass filters are used to allow only a single segment of the light spectrum into an instrument. This helps astrophysicists to know where stars lie on the main sequence, and allows them to identify redshifts.

So a passband is a set of frequencies that get through a bandpass filter which can be executed by hardware, or digitally, by software. For a given snippet the difference between the limiting frequencies is called the bandwidth. So 100 snippets making a key, could have 100 different bandwidths. Each snippet is the spectral range included between a high-pass filter (excluding what's immediately below) and a low-pass filter (excluding what is immediately above).

Using just hardware, making a key with 100 snippets would be exceedingly complex and costly. But such a key with 100 snippets can be made digitally by simply assigning 1's to each frequency that is to be included, and 0's to every other frequency in the range from 200 nm to 1500 nm. Thus a multiple passband signal could be created that includes 100 well-defined snippets and that excludes all else on the entire spectral range from 200 nm to 1500 nm.

Bandwidth is a common concept is spectroscopy. A compound signal composed of many snippets of bandwidth is a central concept of the present invention.

The FIR filter of the present invention should properly be called a "digital multiple bandpass filter". The multiple "snippets" of this invention should properly be called "passbands".

A key component in the authentication method of the present invention is the Finite Impulse Response (herein FIR) filter. This filter is called "finite" because it responds to any finite length input and settles to zero in finite time. FIR filters can be analog, or, in the case of my invention, digital. A digital FIR filter can be designed using a Fast Fourier Transform algorithm.

Using a Programmable Master Fast Fourier algorithm in the frequency domain, a set of variables stored on a programmable ASIC chip, under a specific file number, is called up. The specific variables set is then sent to the Finite Impulse Response (FIR) filter which uses the variables to assign either 0 or a 1 to all frequency points on the fluorescent spectrum from 200 nm to 1500 nm inclusive. The computer is directed to "see" only the frequencies and their associated intensities where the 1's are. The computer does not "see" anything at those frequencies marked by the 0's. Those drop out. The observed spectral profile is now composed of the snippets (passbands) only. This edited-down version is the one from which the key in the database was made, so it's the one that will allow a rating of authentic on the item whose file number matches the file number in the database on the programmable ASIC chip.

The FIR filter is sometimes called a "brick wall" filter, it is commonly used in digital audio where the sampling frequency, which means the rate at which sampling is done, and which is also called the Shannon sampling frequency, or the Nyquist frequency, is 1 divided by 2 times the sampling period (the time over which the sampling is performed). The longer the time for, each sample, the fewer the samples taken. The shorter the time for each sample, the more samples can be taken. High quality sampling, means high resolution, which also means many samples, which means a high sampling frequency, which, all things being equal, would mean a short sampling time for each sample taken. But, if high resolution is required, then more samples, with the same duration per sample, can be taken. This results in more time overall to examine a particular value item.

The first pass through the authentication machine is done at high speed. Rejected value documents or items may then be put back through the authentication machine, operating at lower speed (using more samples with each sample taking the same time as before) to make sure that value documents or items were not falsely rejected due to: soiling, markings, creasing, or some other confounding factor.

Finally, rejected value documents or items can be re-examined using a separate commercial hand-held X-ray spectrograph (not part of the present invention) that "looks", not at the fluorescence from the taggants zone, but at the value material enmeshed and/or affixed in the value item.

"Brick wall" filters that have very sharp low and high end cut-offs would use relatively high quality sampling. In the case of the present invention, where the FIR filter is being required to create multiple passbands, there is a tradeoff between speed and the number of passbands used. Extremely high number of passbands used would result in some delay time in calling up the variables set, converting it to a multiple bandpass filter, and utilizing that filter to make the snippets that constitute the edited-down spectral peaks profile that is the key for a specific value item. The engineering decision, of how many passbands should be programmed into the variables sets, is best made by persons skilled in the art of digital multiple bandpass filters. One key variable is how fast the value items need to be processed. If 5 seconds per value item is allowed, then hundreds of passbands may be feasible. If only 2 seconds are allowed per value item, then fewer passbands will be possible. And, if 1 second or less is allowed, then the number of feasible passbands will again be reduced. This is a management decision, based on the commercial business requirements of being competitive in a given market at a given time.

Most DSP algorithms used in brick wall FIR filters are not complicated and only require multiply and accumulate calculations. The algorithm used in the present invention differs only in that multiple passbands are created all at once along a frequency range from 200 nm to 1500 nm. The algorithm in the FIR filter has to generate the multiple passbands in real time. But, the numerical specification of the passbands to be generated is done by a much larger computer using as much time as it needs. The numerical specifications are stored in the variables sets library of the programmable ASIC chip that the FIT algorithm has access to and can call up according to their file numbers. When the FIT algorithm calls up a variables set, according to a file number, and sends it to the FIR filter, the numerical specifications, defining the passbands, have already been formulated, so the FIR chip uses a Fast Fourier Transform to transform, that set of defining variables, into an actual functioning multiple band-pass filter. Finally, further along in the DSP sequence, the computer "looks" to "see" snippets edited down from the full-wide peaks profile. The content of these passbands comprises the key which must match a previously made key stored in a database in the computer. The key made in the lab and stored in the database, and the key made in the field when authenticating a value document or item are made the same way and from the standardized uniform taggants zone for that series of value documents or items.

Detailed Description of the Taggants Zone of the Invention

To understand the best mode for carrying out the present invention called A Method to Authenticate Value Documents or Items one must grasp two fundamental points. First, rare earth ions including divalent Eu2+, and trivalent ions like Ce3+, Pr3+, Nd3+, Eu3+, Tb3+, Er3+, Tm3+ and Yb3+ can emit photons in the spectral ranges of Near Infra-Red, Visible Light, and near Ultra Violet.

Second, the security of the invention depends mostly on digital signal processing, with the full wide peaks signature being merely the starting point. In this context, the breadth of the peaks profile activity is crucial to making millions of distinct keys and ideal database files from one single original batch of material that makes all the taggant-bearing labels on all the value documents or items in a given series.

Examining the emissions produced by the rare earths mentioned Above, we observe that in the near Ultra-Violet region there can be intense emission from Tm3+, and Yb3+.

We also find that the Near Infra Red sector contains strong emissions from: Er3+ and Ho3+.

We note that some rare earths have far more narrow bands of strong emissions than do other rare earths and in this regard the top performers are: Sm3+ Ho3+ and Er3+ all of which are trivalent rare earths exhibiting at least 10,000 states in excited configuration, and not less than 364 states in ground configuration.

Ho3+ is extremely toward the Near Infra Red end and has emission wavelengths as long as 2.1, and 2.94 micrometers. Er3+ also emits in the micrometer range.

Yb3+ is extremely toward the Ultra Violet end, and has a strong peak around 398 nanometers, just a little shorter than visible light (by 2 nanometers).

From these considerations, all other things being equal, it would be best to include: Yb3+, Sm3+, and Ho3+ in an exemplary mixture of 6 rare earths to comprise an original batch.

Also, where the nanoparticle in which the dopant is embedded itself contains a non-Lanthanide rare earth such as Yttrium, that rare earth does not count as part of the 2 near UV, 2 in visible, and 2 near IR rule. For example YAG (Y3 Al5 O12), and YAM (Y4 Al2 O9), and YAP (Y Al O3). Yttrium plays a major role in nanoparticles because it enhances the activity of the other rare earth that is embedded in that nanoparticle. Sometimes this incorporation into the crystalline structure of the nanoparticle can be enhanced by heat treatment (annealing) or other physical treatment like sintering which can help seat the dopant in the crystalline lattice structure of the nanoparticle so the combined assembly produces more intense fluorescence.

The nomenclature, for purposes of these six examples, will be to list the nanoparticle substrate material first, then the trivalent rare earth ion, then the molar concentration of the substrate nanoparticles, and finally, the molar concentration of the rare earth trivalent ion, for example ZrO2/Er3+ (98/2)

Omitted from the specifics of these nine examples are: the size of the nanoparticles, whether they are annealed or not, and if so, at what temperature, and whether they are sintered or not. These factors can make a difference in the intensity of the peaks because that does depend heavily on the degree of incorporation of the rare earth into the crystalline lattice, but our focus is on the vital issue for purposes of a value document or item which is the width, or breadth of the spectral region in which strong high distinct peaks are produced by the fluorescent material in the taggants zone. The taggants in the taggants zone are in molar concentrations in a range from 0.1 to 30 mole percent.

Example 1

$NaYF_4/Yb^{3+}$ (99/1)
$NaYF_4/Tm^{3+}$ (98/2)
$Y_2O_3/Sm^{3+}$ (96/4)
$ZrO_2/Nd^{3+}$ (99/1)
$ZrO_2/Ho^{3+}$ (98/2)
$LaF_3/Er^{3+}$ (96/4)

Example 2

$Y_2O_3/Yb^{3+}$ (99/1)
$TiO_2/Tm^{3+}$ (98/2)
$ZnS/Sm^{3+}$ (96/4)
$TiO_2/Nd^{3+}$ (99/1)
$TiO_2/Ho^{3+}$ (98/2)
$TiO_2/Er^{3+}$ (96/

Example 3

$SiO_2/Yb^{3+}$ (99/1)
$SiO_2/Tm^{3+}$ (98/2)
$TiO_2/Sm^{3+}$ (96/4)
$SiO_2/Nd^{3+}$ (99/1)
$SiO_2/Ho^{3+}$ (98/2)
$SiO_2/Er^{3+}$ (96/4)

Example 4

$NaYF_4/Yb^{3+}$ (97/3)
$NaYF_4/Tm^{3+}$ (95/5)
$Y_2O_3/Sm^{3+}$ (93/7)
$ZrO_2/Nd^{3+}$ (97/3)
$ZrO_2/Ho^{3+}$ (95/5)
$LaF_3/Er^{3+}$ (93/7)

Example 5

$SiO_2/Yb^{3+}$ (97/3)
$SiO_2/Tm^{3+}$ (95/5)
$TiO_2/Sm^{3+}$ (93/7)
$SiO_2/Nd^{3+}$ (97/3)
$SiO_2/Ho^{3+}$ (95/5)
$SiO_2/Er^{3+}$ (93/7)

Example 6

$Y_2O_3/Yb^{3+}$ (89/11)
$TiO_2/Tm^{3+}$ (87/12)
$ZnS/Sm^{3+}$ (85/15)
$TiO_2/Nd^{3+}$ (89/11)
$TiO_2/Ho^{3+}$ (87/12)
$TiO_2/Er^{3+}$ (85/15)

These six examples show that two rare earth ions, that tend toward the Ultra-Violet, can be (side-by-side and not mixed with each other) in the taggants zone, with two side-by-side rare earth ions that emit in the visible range, and also with two side-by-side rare earth ions whose emissions tend toward the Near Infra-Red range. The purpose of the examples is to show how a full wide range of peaks can be produced by the right side-by-side arrangements of rare earths.

Not included in the examples are bi-dopant and tri-dopant possibilities. In such cases rare earth ions on dopants are used in pairs or triplets which are together doped onto nanoparticles. So, in a sense, these ions are mixed. Much of this work is presented in U.S. Patent WO 2011082031 Al; Brant Kolb, et al; Zirconia-based particles doped with a lanthanide element, for example $ZrO_2/Y_2O_3/La_2O_3$ (95.7/2.3/2.0) or $ZrO_2/Y_2O_3/Er_2O_3$ (95.77/2.18/2.05). Mr. Kolb's emphasis on Zirconia based particles invites the possibility of other nanoparticles that could be used such as YAG ($Y_3Al_5O_{12}$), YAM ($Y_4Al_2O_9$), and YAP ($YAlO_3$), and these have not been present in my six examples, but they could have been. The six examples show how to spread the spectral range out as wide as possible by selecting rare earths that have peaks all along the range from ultra violet to near infra red.

The nanoparticles chosen and their molar concentrations of affect the intensity of the peaks and not the location of the peaks along the electromagnetic spectrum. This invention seeks many emissions, in narrow bands, very intense, and widely dispersed along the spectrum from 200 nm to 1500 nm.

That's why it uses 9 powerful LEDs to generate as much emission activity as possible, and across the widest range of spectrum. The more width we have, the more snippet combinations we can make and have each one be sharp and distinctive. Every bill has its own unique key and its own ideal file in the database in the authentication machine. To make room for millions of bills we need a good-sized segment of spectral range to work with. So picking the right mixtures of dopants matters.

Figure 1:
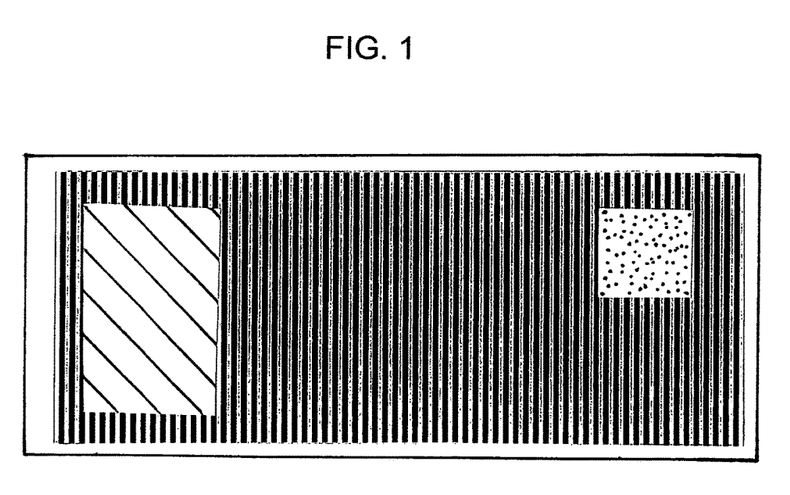
FIG. 1 shows one feature of the method of the present invention which is the side-by-side presentation of the taggants zone, on the left, shown by the rectangle with the broad diagonal stripes, and the QR zone, on the right, shown by the many small dots in the square. The QR zone is strongly encrypted and hard to copy. This may include use of holographic techniques. This configuration exists on any value document or item that uses the method of the present invention.
Figure 2:
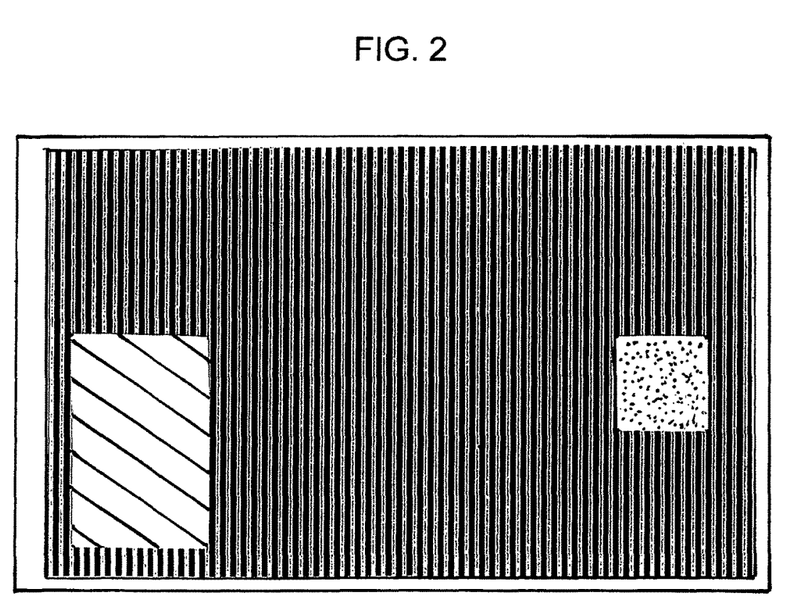
FIG. 2 shows a value document or item, as in FIG. 1, except in a slightly larger size. The value document or item might contain value material, or it might be the back of an ID card, or it might be the back of a slab containing evidence.
Figure 3:
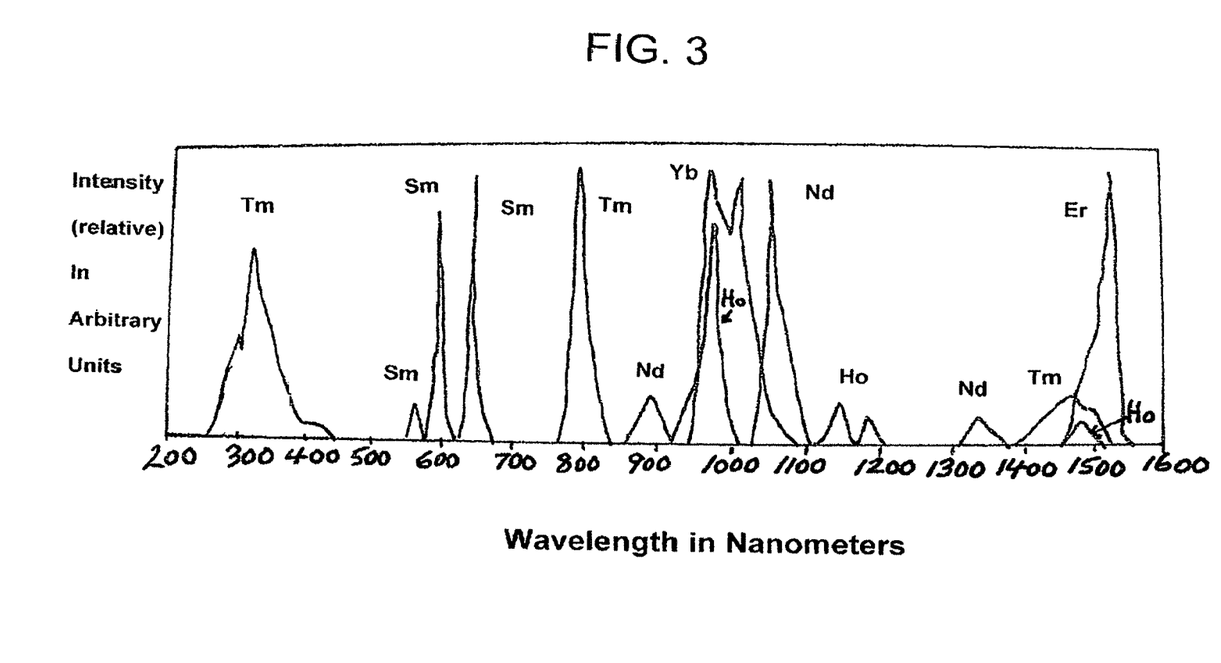
FIG. 3 shows a full wide peaks profile signature that arises from one possible set of taggants in the taggants zone. As may be observed. The fluorescent emissions range from about 200 nm to about 1500 nm. As in the six examples of possible taggant mixtures, care was taken to include some materials that emit in the ultra-violet, and some that emit in the visible region, and some that emit in the near infra-red region. So, you see peaks from about 200 nanometers to about 1500 nanometers, and plenty of intense, peaks in between. This matters, because all the bills in a series use the same taggants mix. So that mix must produce activity over a wide range, so that the digital signal processing side of the invention has room to create snippets of many numbers, widths, and locations.
Figure 4:
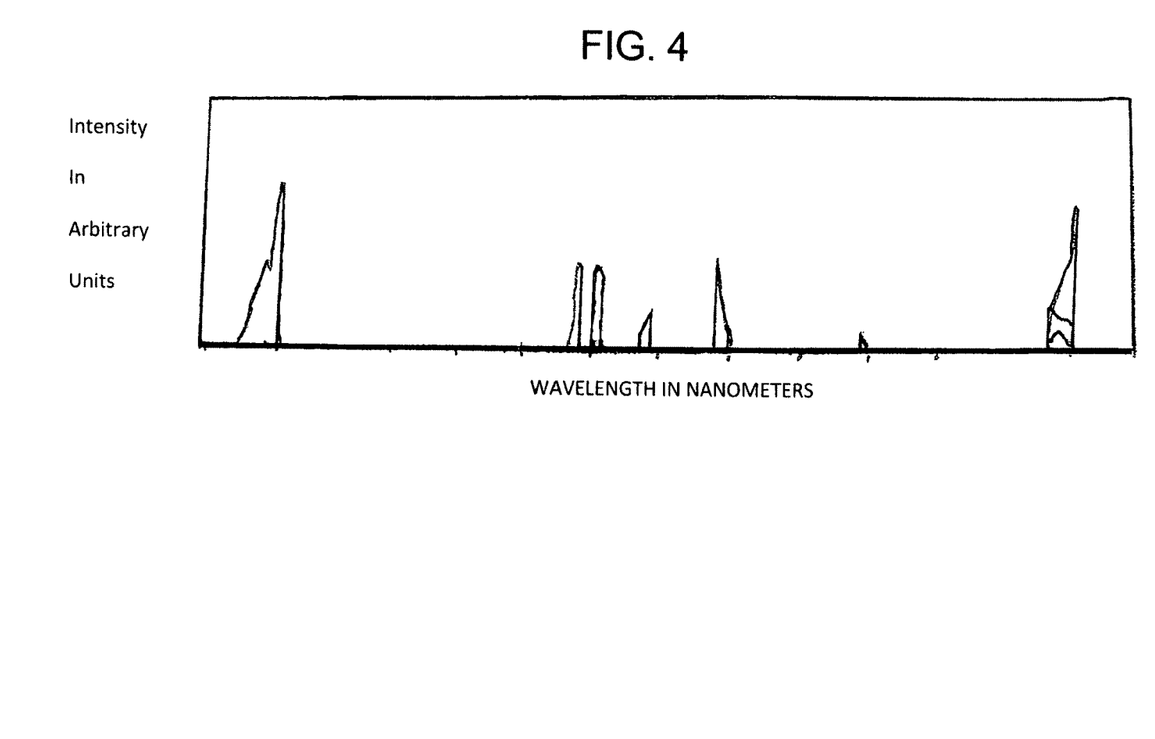
FIG. 4 shows one example of what the programmable finite impulse transform along with a finite impulse response filter might generate as snippets based on one specific combination of variables drawn from the library of variables sets according to the file number on the value document or item being examined. Imagine this is value document or item with file number 947283, and the variables have been processed through the finite impulse response filter, sometimes called a "brick wall" filter, and everything along the peaks signature line has been bricked walled out except for the 7 snippets you see. The one on the far right, as the drawing shows, has several intensities at several wavelengths in it. The database comparison file is made using the exact same variables, and so it "knows" what the incoming edited emission is "supposed" to look like. It only has to do a one-to-one comparison of the actual received edited peaks signature and the edited peaks signature on file. This happens quickly using Fast Fourier transform algorithms.
Figure 5:
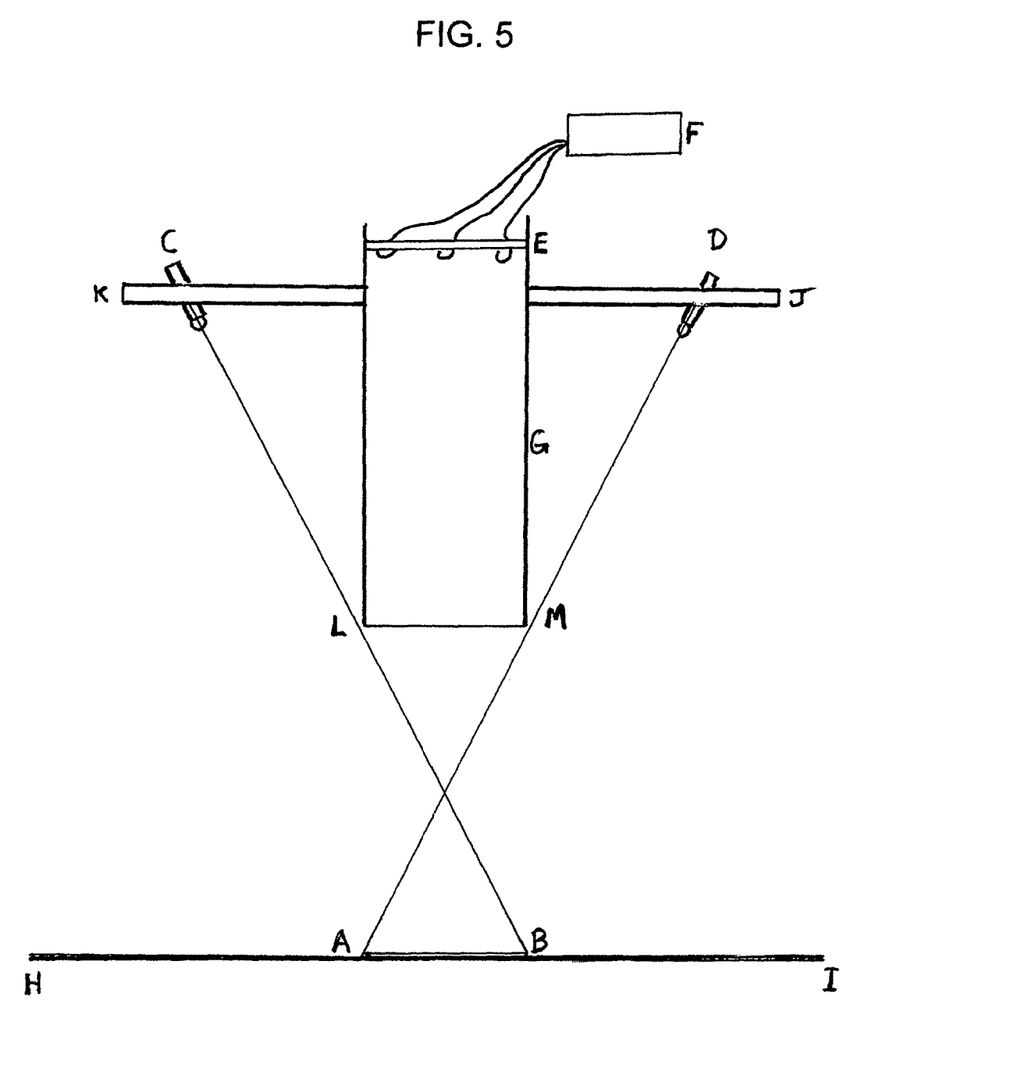
Figure 6:
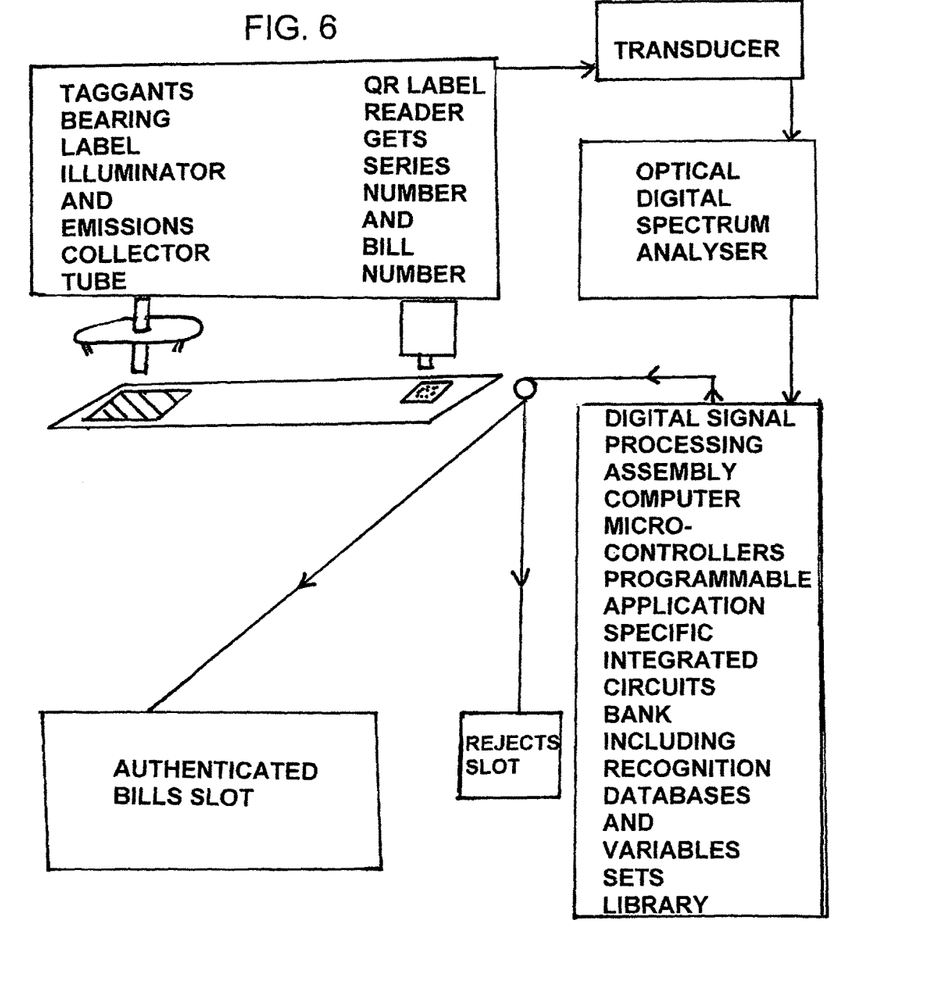

These examples are meant to teach but not to be exclusive in any way. The six dopants chosen for the examples, are the ones whose peaks profiles were used to create on the FIG. 4 which displays 7 snippets taken from those peaks profiles and which range from About 200 nanometers to a snippet that has wavelengths around 1500 nanometers in it. The roomy full wide spectral range is what allows the many variations of snippets, in number, width, and placement, so that every bill can have its own key in the database. This is why so much emphasis was placed all along on using taggants that emit on opposite ends, as well as in the middle of the spectrum of possible taggant emissions. This is why 9 LEDs are necessary, and why they must all excite the taggant-bearing label at the same time, and why the entire set of emissions produced must be precisely processed through several analog devices, and then finally sent to the digital signal processing end of the authentication machine.

PATENT CITATIONS

U.S. Pat. No. 8,328,102 B2; date December 2012; Rapoport; William R. CPC Classification G07D7/122; US Classification 235/468

U.S. Pat. No. 7,926,730 B2; date April 2011; Auslander; Judith D.; CPC Classification G06K19/06046; US Classification 235/487

U.S. Pat. No. 7,845,570 B2; date December 2010; Schwenk; Gerhard; CPC Classification G07D7/0026; US Classification 235/487

U.S. Pat. No. 7,441,704 B2; date October 2008; Ross; Gary A.; CPC Classification G06K19/06009; US Classification 235/454

U.S. Pat. No. 5,986,550 A; date November 1999 Rapaport; Erich I.; CPC Classification G01R33/44; US Classification 235/380

U.S. Pat. No. 20050178841 A1 Guilford Jones, et al., System and Methods for Product and Document Authentication.

U.S. Pat. 20100149531 A1 Shu Tuen Tang, Apparatus and Method for Object Authentication Using Taggant Material.

U.S. Pat. 20060186348 A1 Brian Nguyen, et al., Method for Encoding Materials with a Luminescent Tag and Apparatus for Reading Same.

U.S. Pat. 20080048106 A1 Elwood Neal Blanchard, et al., Method and Apparatus for Verifying the Authenticity of an Item by Detecting Encoded Luminescent Security Markers.

U.S. Pat. No. WO 2011082031 A1 Brant U. Kolb, et al., Zirconia-based Particles Doped with a Lanthanide Element.

U.S. Pat. 20030111644 A1 In-Gann Chen, et al., Process for Producing Nanoscale Yttrium Aluminum Garnet (YAG) Fluorescent Powders.

U.S. Pat. No. 6,699,406 B2 Richard E. Riman and John Ballato, et al., Rare Earth Doped Host Materials.

U.S. Pat. No. 20060033325 A1 Sriramakrishna Maruvada, et al., Authenticatable Article and Method of Authenticating.

U.S. Pat. No. 20090224218 A1 George M. Williams, et al., Photoactive Taggant Materials Comprising Semiconductor Nanoparticles and Lanthanide Ions.

U.S. Pat. No. 20130040150 A1 Morgana M. Trexler, et al., Nanoparticle Taggants for Explosive Precursors.

U.S. Pat. No. 6,699,406 B2 Richard E. Riman, et al., Rare Earth Doped Host Materials.

U.S. Pat. No. 6,096,387 A Thomas A. Decker, Methods for Providing Self-Adhesive Resealable Tamper-Evident Tape.

U.S. Pat. No. 6,663,960 B1 Toru Murakami, et al., Fluorescent Particles, Method for Preparing the Same and Paper Preventing Forgery Using the Fluorescent Particles.

U.S. Pat. No. 6,692,031 B2 Stephen P. McGrew, Quantum Dot Security Device and Method.

U.S. Pat. No. 5,411,295 A Scott B. Bates, et al., Tamper-evident Label.

U.S. Pat. No. 6,447,015 B1, Ron Linnewiel, Tamper-Evident Tapes and Labels.

U.S. Pat. No. 20110147450 A1 William Ross Rapoport, et al., Method and Authentication for Authenticating Value Documents.

NON-PATENT CITATIONS

"Handbook on the Physics and Chemistry of Rare Earths" Optical Spectroscopy Volume 37, Edited by Karl A. Gschneidner, Jr.; Jean-Claude G. Bunzli; and Vitalii K. Pecharsky; Published by Elsevier (North-Holland imprint); First Edition 2007; ISBN: 078-0-444-52144-6; ISSN: 0168-1273

"The Sol-Gel Handbook" (3 volume set) Edited by David Levy and Marcos Zayat Published by Wiley-VCH, 2015 Wiley-VCH Verlag GmbH & Co. Weinheim, Germany ISBN: 978-3-527-33486-5.

Digital Communications (2nd ed.), Glover, I. and Grant, P. Pearson Education Ltd. (2004)

Digital Communications (3rd ed.), Proakis, J., McGraw-Hill Inc. (1995)

Signals and Systems, Alan V. Oppenheim, Alan S. Willsky, and Ian T. Young, Prentiss-Hall Inc., (1983)

Theory and Applications of Digital Signal Processing, Lawrence R. Rabiner and Bernard Gold, Prentice-Hall, Inc. (1975)

Practical Signal Processing, Mark Owen, Cambridge University Press (2007)

Introduction to Digital Signal Processing and Filter Design, Belle A. Shenoi, John Wiley and Sons, (2006)

Nonlinear System Identification: NARMAX Methods in the Time, Frequency, and Spatio-Temporal Domains, Stephen A. Billings, Wiley, (2013)

Digital Signal Processing: Instant Access (1st ed.), James D. Broesch, Dag Stranneby, and William Walker, Butterworth-Heinemann-Newnes (2008)

Digital Signal Processing and Applications (2nd ed.), Dag Stranneby and William Walker, Elsevier publ., (2004)

What is claimed is:

1. A method for documents or items authentication, said method comprising: providing one fluorescent tag, said fluorescent tag being applied to said documents or items; providing one hologram secretly containing a file number, said hologram being applied to said documents or items; scanning said fluorescent tag and said hologram secretly containing the file number simultaneously; analyzing returned signals from said fluorescent tag, and deciphering said file number in the hologram, wherein said fluorescent tag is comprised of dopants on nanoparticles such that a wide peaks profile from 400 nanometers to 1200 nanometers is generated when said fluorescent tag is exposed to light from a group of LED illuminators, wherein said dopants are Lanthanides, and the nanoparticles are metal oxides or metal salts, and wherein said Lanthanides consist of: Yb3+, Tm3+, Sm3+, Nd3+, Ho3+, and Er3+; providing a fluorescence detector assembly for detecting photons in the range from 400 nanometers to 1200 nanometers, a signal processor assembly including an optical digital spectrum analyzer, a digital signal processing computer including a programmable finite impulse transform (FIT), and a programmable finite impulse response (FIR) filter, such that together they comprise a programmable multiple passband filter; said programmable multiple passband filter makes segments or snippets of photons analyzed by an optical digital spectrum analyzer; and storing said snippets in a database of a computer under the secret file number, for comparison to snippets generated from a document or item to be authenticated as the document or item is examined by an authenticating machine.

2. A method for documents or items authentication, said method comprising: providing one fluorescent tag, said fluorescent tag being applied to said documents or items; providing one hologram secretly containing a file number, said hologram being applied to said documents or items; scanning said fluorescent tag and said hologram secretly containing the file number simultaneously; analyzing returned signals from said fluorescent tag, and deciphering said file number in the hologram, wherein said fluorescent tag is comprised of dopants on nanoparticles such that a wide peaks profile from 400 nanometers to 1200 nanometers is generated when said fluorescent tag is exposed to light from a group of LED illuminators, wherein said dopants are Lanthanides, and the nanoparticles are metal oxides or metal salts, and wherein said metal oxides consisting of: Y2O3, ZrO2, and TiO2; providing a fluorescence detector assembly for detecting photons in the range from 400 nanometers to 1200 nanometers, a signal processor assembly including an optical digital spectrum analyzer, a digital signal processing computer including a programmable finite impulse transform (FIT), and a programmable finite impulse response (FIR) filter, such that together they comprise a programmable multiple passband filter; said programmable multiple passband filter makes segments or snippets of photons analyzed by an optical digital spectrum analyzer; and storing said snippets in a database of a computer under the secret file number, for comparison to snippets generated from a document Or item to be authenticated as the document or item is examined by an authenticating machine.

3. A method for documents or items authentication, said method comprising: providing one fluorescent tag, said fluorescent tag being applied to said documents or items; providing one hologram secretly containing a file number, said hologram being applied to said documents or items; scanning said fluorescent tag and said hologram secretly containing the file number simultaneously; analyzing returned signals from said fluorescent tag, and deciphering said file number in the hologram, wherein said fluorescent tag is comprised of dopants on nanoparticles such that a wide peaks profile from 400 nanometers to 1200 nanometers is generated when said fluorescent tag is exposed to light from a group of LED illuminators, wherein said dopants are Lanthanides, and the nanoparticles are metal oxides or metal salts, and wherein said metal salts consist of: NaYF4, LaF3, and ZnS; providing a fluorescence detector assembly for detecting photons in the range from 400 nanometers to 1200 nanometers, a signal processor assembly including an optical digital spectrum analyzer, a digital signal processing computer including a programmable finite impulse transform (FIT), and a programmable finite impulse response (FIR) filter, such that together they comprise a programmable multiple passband filter; said programmable multiple passband filter makes segments or snippets of photons analyzed by an optical digital spectrum analyzer; and storing said snippets in a database of a computer under the secret file number, for comparison to snippets generated from a document or item to be authenticated as the document or item is examined by an authenticating machine.

\* \* \* \* \*